United States Patent Office 3,737,475
Patented June 5, 1973

3,737,475
ALPHA-OLEFIN PRODUCTION
Ronald F. Mason, Westwell Ashford, England, assignor to Shell Oil Company
No Drawing. Filed Aug. 17, 1972, Ser. No. 281,590
Int. Cl. C07c 3/10
U.S. Cl. 260—683.15 D   8 Claims

ABSTRACT OF THE DISCLOSURE

Ethylene is oligomerized to linear, alpha-olefins by reacting ethylene in a $C_2$-$C_4$ vic-alkanediol solution in the presence of a catalyst composition produced by contacting in the presence of ethylene (1) a simple divalent nickel salt (2) a boron hydride reducing agent and (3) dicyclohexylphosphinopropionic acid or alkali metal salt thereof.

BACKGROUND OF THE INVENTION

Field of the invention

The present invention relates to the production of linear alpha-olefins which are compounds of established utility in a variety of applications. Such olefins, particularly $C_{12}$-$C_{20}$, are converted by treatment with sulfur trioxide, to alpha-olefin sulfonates, which are useful as biodegradable detergents. Alternatively, such olefins are converted to the corresponding alcohols as by conventional "Oxo" processes or sulfuric acid catalyzed hydration. The $C_{12}$-$C_{20}$ alcohols thus produced are ethoxylated with ethylene oxide in the presence of a basic catalyst, e.g., sodium hydroxide, to form conventional detergents and lower molecular weight alcohols are esterified with polyhydric acids, e.g., phthalic acid, to form plasticizers for polyvinyl chloride.

Description of the prior art

Catalysts useful for the conversion of ethylene to linear alpha-olefins are known: For example, U.S. Pat. 3,644,563 to Keim et al., common assignee, discloses a class of polymerization catalysts which comprises a nickel chelate produced by contacting a zero-valent nickel compound, e.g., bis-1,5-cyclooctadienenickel(0), and a phosphino-substituted carboxylic acid, e.g., diphenylphosphinoacetic acid. A related process of Singleton et al., co-pending U.S. Ser. No. 94,589, common assignee, filed Dec. 2, 1970, employs a catalyst composition produced by contacting a zero-valent nickel compound, e.g., bis-1,5-cyclo-octadienenickel(0), and a dihydrocarbylphosphino substituted benzoic acid, e.g., o-(methylphenylphosphino)-benzoic acid.

Also, U.S. Pat. 3,676,523 to Mason, common assignee, discloses a class of ethylene oligomerization catalysts produced by contacting in the presence of ethylene (1) a simple divalent nickel salt (2) a boron hydride reducing agent and (3) an o-dihydrocarbylphosphinobenzoic acid or alkali metal salt thereof.

Although the catalyst compositions described above give generally satisfactory results in most applications, they are subject to certain inherent limitations which detract from their attractiveness in large scale operations. For instance, the catalyst compositions of U.S. Pat. 3,644,-563 and copending U.S. Ser. No. 94,589 both require the use of expensive zero valent nickel compounds as catalyst precursors which are thermally and oxidatively unstable. Also, while the use of expensive and unstable catalyst precursors is avoided with the catalysts of U.S. 3,676,523, the active species of the catalyst compositions of this patent are not as stable as might be desired in typical ethylene oligomerization processes and the catalyst consumption in these processes is undesirably high. Therefore, it would be of advantage if a catalyst composition was available which avoids the use of expensive and unstable zero-valent nickel compounds but which also is sufficiently stable in its active form so that catalyst consumption in large scale operations is minimized.

SUMMARY OF THE INVENTION

It has now been found that an improved process of oligomerizing ethylene to linear alpha-olefins is obtained by reacting ethylene in a $C_2$-$C_4$ vic-alkanediol solution in the presence of a catalyst composition produced by contacting in a polar organic solvent in the presence of ethylene (1) a simple divalent nickel salt (2) a boron hydride reducing agent (3) a dicyclohexylphosphinopropionate ligand. This process affords ethylene conversions to a linear alpha-olefin product mixture of relatively high proportion of olefinic products in the higher molecular range, e.g., $C_{12}$-$C_{20}$ alpha-olefins, while at the same time providing an active catalyst species of superior stability both as to the rate of reaction and the molecular weight distribution of olefinic product at reaction conditions.

DESCRIPTION OF PREFERRED EMBODIMENTS

Nickel salts.—In general, any simple divalent nickel salt can be employed for preparing the catalyst composition of the invention provided the nickel salt is sufficiently soluble in the reaction medium. By the term "simple divalent" nickel salt is meant a nickel atom having a formal valence of +2 and bonded through ionic or electrovalent linkages to two singly charged anionic groups (e.g., halides) or to one doubly charged anionic group (e.g., carbonate) and not complexed with or coordinated to any other additional molecular or ionic species. Simple divalent nickel salts therefore do not encompass complex divalent nickel salts which are bonded to one or two anionic groups and additionally complexed or coordinated to neutral chelating ligands or groups such as carbon monoxide and phosphines. However, simple divalent nickel salts are meant to include nickel salts containing water of crystallization in addition to one or two anionic groups.

In most instances, a single divalent nickel salt with a solubility in the reaction diluent or solvent employed for catalyst preparation of at least 0.001 mole per liter (0.001 M) is satisfactory for use as the nickel catalyst precursor. A solubility in the reaction diluent or solvent of at least 0.01 mole per liter (0.01 M) is preferred, and a solubility of at least 0.05 mole per liter (0.05 M) is most preferred. Reaction diluents and solvents suitably employed for catalyst preparation are polar organic solvents including the vic-alkanediol solvents employed for the oligomerization process which are defined below.

Suitable simple divalent nickel salts include inorganic as well as organic divalent nickel salts. Illustrative inorganic nickel salts are nickel halides such as nickel chloride, nickel bromide and nickel iodide, nickel carbonate, nickel chlorate, nickel ferrocyanide, and nickel nitrate. Illustrative organic divalent nickel salts are nickel salts of carboxylic acids such as nickel alkanoates of up to 10 carbon atoms, preferably of up to 6 carbon atoms, e.g., nickel formate, nickel acetate, nickel propionate, nickel hexanoate and the like; nickel oxalate, nickel benzoate and nickel naphthenate. Other suitable organic salts include nickel benzenesulfonate, nickel citrate, nickel dimethylglyoxime and nickel acetylacetonate.

Nickel halides, especially nickel chloride, and nickel alkanoates, especially nickel acetate, in part because of their availability at low cost and solubility in polar organic solvents, are preferred nickel salts.

Phosphinopropionic acid ligand.—The dicyclohexyl-phosphinopropionate ligands employed in the preparation of the catalyst composition of the invention are described by the structural formula

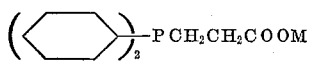

wherein M is hydrogen or an alkali metal, preferably sodium or potassium. These ligands are known compounds and are prepared by conventional methods such as the reaction of dicyclohexyl phosphine with 3-chloropropionic acid to yield a phosphonium salt intermediate which can be subsequently treated with a base to afford the desired phosphino acid.

Although the dicyclohexylphosphinopropioniate catalyst precursor is suitably employed as the free acid, better results are obtained with the alkali metal salts of the phosphinopropionic acid. The alkali metal salts are suitable preformed from the propionic acid by treatment with an alkali metal hydroxide solution prior to catalyst preparation or, alternatively, the carboxylic acid salt is generated in situ by the reaction of equimolar amounts of the carboxylic acid and an alkali metal hydroxide during catalyst preparation.

When preparing the catalyst, the molar ratio of nickel to propionate ligand (free acid or salt thereof) may suitably range from 0.2:1 up to 5:1. Preferred molar ratios of nickel salt to acetate ligand (free acid or salt thereof) range from 0.5:1 to 2:1, although molar ratios of about 0.5:1 to 1.5:1 are most preferred.

Boron hydride reducing agent.—In general, any boron hydride salt reducing agent of reasonable purity is suitable for use in the process of the invention. Specific examples include alkali metal borohydrides such as sodium borohydrides, potassium borohydride and lithium borohydride; alkali metal alkoxyborohydrides wherein each alkoxy has 1–4 carbon atoms, such as sodium trimethoxyborohydride and potassium tripropoxyborohydride and tetraalkylammonium borohydrides wherein each alkyl has 1–4 carbon atoms, such as tetraethylammonium borohydride. Largely because of commercial availability, alkali metal borohydrides are preferred and especially preferred is sodium borohydride.

When preparing the catalyst, the molar ratio of borohydride salt to nickel salt is at least 0.5:1. There does not appear to be a definite upper limit on the boron hydride/nickel ratio, but for economic reasons it is especially preferred that the molar ratio be not greater than 15:1. The preferred molar ratio of boron hydride to nickel salt is usually between about 1:1 and about 2:1. Best results are often obtained when the molar ratio is about 1:1.

Catalyst preparation.—The catalyst composition of the present invention is suitably preformed by contacting the catalyst precursors, i.e., the nickel salt, the dicyclohexylphosphinopropionate ligand and the boron hydride reducing agent, in a polar organic diluent or solvent, e.g., polar organic diluents or solvents which are not reduced by the boron hydride reducing agent to any substantial degree and include the vic-alkanediol solvents employed in the oligomerization process. In a preferred modification, the solvent, the nickel salt and the propionate ligand are contacted in the presence of ethylene before the addition of the boron hydride reducing agent. In order to obtain the improved catalyst of the invention, it is essential that the catalyst composition is prepared in the presence of the ethylene reactant. Generally, the catalyst components are contacted under 10 to 1500 p.s.i.g. of ethylene.

By any modification, the catalyst is generally prepared at temperatures of about 0° C. to 150° C., although temperatures in the range of 10–90° C. are preferred. Contact times of about 5 minutes to 1 hour are generally satisfactory.

Reaction conditions.—The ethylene is contacted with the catalyst composition in the liquid phase in the presence of a reaction solvent comprising a vic-alkanediol of up to 4 carbon atoms. Amounts of vic-alkanediol reaction solvent of up to 30 liters per mole of ethylene are satisfactorily employed. Generally, the concentration of the catalyst (calculated as parts per million of ligand in the reaction solvent) is at least 100 p.p.m. and may suitably range as high as 5000 p.p.m. depending on the reaction rate desired.

However, catalyst concentrations of about 300 to about 2000 p.p.m. are preferred with catalyst concentrations of from about 500 to about 1000 p.p.m. being most preferred.

The vic-alkanediol solvents contemplated for use in the process of the invention may be otherwise described as dihydroxyalkanols of up to 4 carbon atoms wherein the hydroxy moieties are attached to adjacent carbon atoms and include, specifically, ethyene glycol, propylene atoms, 2 - methyl - 1,2 - propanediol, 1,2-butanediol, 2,3-butandiol or mixtures thereof. Of the vic-alkanediol solvents described, ethylene glycol, propylene glycol and various mixtures thereof, are preferred. When the vic-alkanediol solvents, described above, are utilized as reaction solvents in the process, a two phase reaction mixture is formed, in part, because the ethylene oligomerization product mixture is essentially insoluble in the solvent. For example, when ethylene glycol is employed as the reaction solvent, a two phase reaction mixture is formed, i.e., one phase comprising the ethylene oligomerization product mixture, i.e., the alpha-olefins, and a second phase comprising the nickel catalyst and the ethylene glycol solvent. This is advantageous because when a two phase reaction mass is formed, the ethylene oligomerization product phase can be separated and the catalyst containing diluent or solvent phase can be recycled to the reaction zone and be utilized for further ethylene oligomerization.

The precise method of establishing ethylene/catalyst contact during the oligomerization reaction is not critical. In one modification, the catalyst composition and the solvent are charged to an autoclave or similar pressure reactor, the ethylene is introduced, and the reaction mixture is maintained with agitation at reaction temperature and pressure for the desired reaction period. Since with the vic-alkanediol reaction solvents of this invention a two phase reaction is formed, it is quite convenient to employ a continuous reaction system wherein ethylene is passed in a continuous manner into a reaction zone containing the catalyst composition and the diluent while ethylene oligomerization product mixture which is produced is concomitantly withdrawn from the reaction zone.

By any modification, the oligomerization process is conducted at moderate temperatures and pressures. Suitable reaction temperatures vary from about 80° C. to 150° C. but preferably from about 90° C. to 120° C. The reaction is conducted at or above atmosphere pressure. The precise pressure is not critical so long as the reaction mixture is maintained substantially in a liquid phase. Typical pressures vary from about 500 p.s.i.g. to 2500 p.s.i.g. with the range from about 1100 p.s.i.g. to 2000 p.s.i.g. being preferred.

The oligomerization products are separated and recovered from the reaction mixture by conventional methods such as fractional distillation, selective extraction, adsorption and the like. The reaction solvents, catalyst and any unreacted ethylene are recycled for further utilization. Spent catalyst, i.e., catalyst no longer active for ethylene oligomerization, is regenerated by reacting with additional boron hydride reducing agent and nickel salt in the molar ratios (based on propionate ligand) hereinbefore defined. No additional propionate ligand is required to regenerate the spend catalyst.

ILLUSTRATIVE EMBODIMENTS I–IX

A series of ethylene oligomerizations was conduced with a nickel catalyst prepared by reacting nickel chloride hexahydrate ($NiCl_2 \cdot 6H_2O$), potassium salt of dicyclohexylphosphinopropionic acid and sodium borohydride in a reaction medium of various vic-alkanediols or mixtures of vic-alkanediols and ethylene. Each reaction was conducted by charging 2.2 to 8.8 millimoles of $NiCl_2 \cdot 6H_2O$, 3.2 to 8.8 millimoles of propionate ligand and 1200 to 1600 g. of the vic-alkanediol solvent to a 4 liter Magnedrive autoclave maintained at atmospheric pressure under inert gas or ethylene atmosphere. The autoclave was then charged with about 800 p.s.i.g. ethylene pressure and 2.2 to 9.0 millimoles of sodium borohydride (1.6 molar aqueous solution) which is made up and used immediately, was added to the reaction solution. The autoclave was maintained at 25° C. for 15 minutes and then heated to 100–130° C. and maintained at a constant ethylene pressure of either 1100 or 1400 p.s.i.g. by continual addition of ethylene. The reactions were allowed to continue for periods of time ranging from 4 to 12 hours and about 25–150 g. samples of the oligomer phase in the reactor were withdrawn at periodic intervals during the course of the reaction to determine the oligomer product distribution. The results of this series of ethylene oligomerization reactions are recorded in Table I as runs 1 to 9 along with the pertinent reaction conditions and parameters for each run. The nickel chloride concentration in each reactor is calculated as p.p.m. of nickel in the vic-alkanediol solvent. Likewise, the ligand concentration in each reaction is calculated as p.p.m. ligand in the vic-alkanediol solvent. The value for reaction rate which is recorded in the table at periodic intervals over the course of the reaction for selected ethylene oligomerization runs according to the above procedure is based on average ethylene uptake by the reaction system in grams of ethylene per liter of reactor volume per hour during the hour interval indicated. The results of each oligomerization reaction in terms of the molecular weight distribution of ethylene oligomers of the desired $C_{12}$–$C_{24}$ range in the product mixture over the course of the reaction, are recorded in the table as the Product Distribution ("K" factor). The "K" factor is derived from a gas-liquid chromatographic (GLC) analysis of the oligomer product which determines the quantities of each oligomer fraction, e.g., $C_{12}$, $C_{14}$, $C_{16}$ of the $C_{12}$ to $C_{24}$ molecular weight range present in the product. As utilized in the table, the "K" factors are obtained by averaging the ratios of the moles of an oligomer of $C_n$ carbon atoms to the moles of the next higher oligomer of $C_n+2$ carbon atoms present in the product according to the mathematical expression:

$$K = \frac{c_n}{c_{n+2}} \text{ (moles)}$$

over a series of carbon numbers wherein the lowest carbon number for $C_n$ is 12 and the highest carbon number for $C_n+2$ is 24.

In all of the runs conducted according to the above-described procedure, the "reaction rate" and "K" factor, as determined above, appeared to approximate constant values (steady state) over the duration of the run, thus indicating the stability of the catalyst with respect to these variables. These "steady state" values for reaction rate and "K" factors are recorded in the table for all of the runs described therein (including those for which periodic determinations of reaction rate and "K" factor are given) and reflect the best estimation of the constant value as derived from a series of periodic determinations of each variable over the course of the reaction.

GLC analysis of the $C_{12}$ fraction of the oligomers produced in Runs 1–9 showed that the $C_{12}$ olefins consisted of about 92 to 97%/w. linear α-olefins, about 1 to 4%/w. linear internal olefins and about 1 to 5%/w. branched olefins.

TABLE I

| Run No. | Reaction temp. (°C.) | Reaction solvent | Mole ratio nickel ligand | Mole ratio NaBH₄ nickel | Nickel conc. (p.p.m.) | Ligand conc. (p.p.m.) | 2 hr. rate | K | 4 hr. rate | K | 6 hr. rate | K | 8 hr. rate | K | 10 hr. rate | K | 12 hr. rate | K | Steady state reaction rate, g. ethylene/l reactor/hr. | Steady state K factor ($C_{12}$–$C_{24}$) | Total run, hrs. |
|---|---|---|---|---|---|---|---|---|---|---|---|---|---|---|---|---|---|---|---|---|---|
| 1 a | 110 | Propylene glycol | 1.07 | 0.99 | 218 | 1,068 | 220 | 0.89 | 165 | 0.86 | 165 | 0.86 | 165 | 0.86 | | | | | 165 | 0.86 | |
| 2 a | 125 | ...do... | 0.89 | 0.69 | 457 | 2,700 | 640 | 0.83 | 630 | 0.81 | 620 | 0.80 | 600 | 0.78 | | | | | 630 | 0.78 | |
| 3 | 110 | 1:1 ethylene glycol:propylene glycol | 1.0 | 1.02 | 400 | 2,084 | 190 | 0.81 | 160 | 0.80 | 155 | 0.79 | 155 | | 155 | 0.78 | 155 | 0.78 | 155 | 0.78 | 11 |
| 4 | 110 | ...do... | 0.5 | 1.05 | 201 | 2,106 | 260 | 0.81 | 200 | 0.81 | 200 | 0.81 | 195 | 0.81 | | | | | 195 | 0.81 | |
| 5 b | 100 | Propylene glycol | 1.0 | 1.0 | 399 | 2,096 | | | | | | | | | | | | | 182 | 0.83 | |
| 6 b | 110 | 4:1 ethylene glycol:propylene glycol | 1.0 | 1.1 | 120 | 627 | | | | | | | | | | | | | 84 | 0.81 | 6.6 |
| 7 b | 110 | 1:1 ethylene glycol:propylene glycol | 1.0 | 1.1 | 120 | 634 | | | | | | | | | | | | | 103 | 0.83 | 6.0 |
| 8 b | 120 | Ethylene glycol | 1.0 | 1.08 | 121 | 632 | | | | | | | | | | | | | 131 | 0.76 | 3.8 |
| 9 b | 130 | ...do... | 1.0 | 1.07 | 120 | 626 | | | | | | | | | | | | | 130 | 0.75 | 3.7 | a Runs 1 and 2 were conducted at 1,100 p.s.i.g. ethylene pressure, the remainder of the runs were conducted at 1,400 p.s.i.g. ethylene pressure.
b Small amount of sodium chloride (1–2 g.) added to the reaction mass.

I claim as my invention:

1. A process of oligomerizing ethylene to linear, alpha-olefins by reacting ethylene in a $C_2$-$C_4$ vic-alkanediol solution at a temperature of about 90° C. to 150° C. in the presence of a catalyst composition produced by contacting in a polar organic solvent in the presence of ethylene (1) a simple divalent nickel salt having a solubility of at least 0.001 mole per liter in said polar organic solvent, (2) a boron hydride reducing agent and (3) a dicyclohexylphosphinopropionate ligand represented by the formula

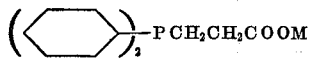

wherein M is hydrogen or alkali metal, the molar ratio of nickel salt to ligand being from about 0.2:1 to 5:1.

2. The process of claim 1 wherein the vic-alkanediol solvent employed in the ethylene oligomerization reaction is selected from the class consisting of ethylene glycol, propylene glycol or mixtures thereof.

3. The process of claim 2 wherein the catalyst composition is produced in the presence of about 10 p.s.i.g. to 1500 p.s.i.g. of ethylene at a temperature of about 0° to 150° C.

4. The process of claim 3 wherein the nickel salt has a solubility of at least 0.01 mole per liter in polar organic solvent employed for catalyst preparation.

5. The process of claim 3 wherein the catalyst is prepared in the same $C_2$-$C_4$ vic-alkanediol solvent as is employed in the ethylene oligomerization reaction.

6. The process of claim 5 wherein boron hydride reducing agent is an alkali metal borohydride, the molar ratio of alkali metal borohydride to nickel salt is about 0.5:1 to 15:1 and M is hydrogen, sodium or potassium.

7. The process of claim 6 wherein the nickel salt is a nickel halide.

8. The process of claim 7 wherein the boron hydride reducing agent is sodium borohydride, the nickel salt is nickel chloride and M is potassium.

References Cited

UNITED STATES PATENTS

| | | | |
|---|---|---|---|
| 3,676,523 | 7/1972 | Mason | 260—683.15 |
| 3,686,351 | 8/1972 | Mason | 260—683.15 |

PAUL M. COUGHLAN, Jr., Primary Examiner

U.S. Cl. X.R.

252—429 B

UNITED STATES PATENT OFFICE
CERTIFICATE OF CORRECTION

PATENT NO. : 3,737,475
DATED : June 5, 1973
INVENTOR(S) : RONALD F. MASON

It is certified that error appears in the above-identified patent and that said Letters Patent are hereby corrected as shown below:

Column 5, lines 50 et seq, the mathematical expression which reads $$"K = \frac{C_n}{C_n + 2} \text{ (moles)}"$$

should read $$-- K = \frac{C_n + 2}{C_n} \text{ (moles)} --.$$

Signed and Sealed this

Thirty-first Day of October 1978

[SEAL]

Attest:

RUTH C. MASON
Attesting Officer

DONALD W. BANNER
Commissioner of Patents and Trademarks